UNITED STATES PATENT OFFICE 2,398,612

OXIDATION OF ORGANIC COMPOUNDS

Ingolfur Bergsteinsson, Billings, Mont., and James R. Scheibli and Frank H. Dickey, Oakland, Calif., assignors to Shell Development Company, San Francisco, Calif., a corporation of Delaware No Drawing. Application October 2, 1942, Serial No. 460,728

4 Claims. (Cl. 260—533)

This invention relates to a process for the controlled oxidation of organic compounds. More particularly it relates to such an improved oxidation process wherein the peroxides produced therein are inactivated or destroyed shortly after their formation. A preferred embodiment of the invention comprises the vapor phase oxidation of a hydrocarbon to carbonylic compounds such as propane to propionaldehyde, acetone, formaldehyde, etc., in the presence of one or more of the herein-described peroxide-destroying catalysts.

The invention is based in part on the finding that in the oxidation of gaseous organic compounds a higher yield of carbonylic product is obtained in a shorter time by passing the reaction mixture successively through two (or more) reaction sections, the second of which is packed with a peroxide-destroying catalyst such as, for example, silicon carbide porous aggregates.

In the controlled oxidation of hydrocarbons or organic compounds in the vapor phase, using air, oxygen, or oxygen-containing gases, products of a very heterogeneous nature are usually obtained. For instance, in the non-catalytic controlled oxidation of propane under conditions favoring aldehyde production, appreciable quantities of peroxides, alcohols, and organic acids are formed. Attempts to recover aldehydes from the mixture by distillation result in oxidation of a portion of the aldehyde to acids, thus destroying some of the valuable product and complicating the process of separation. Distillation likewise involves considerable explosion hazard due to the peroxides. Also the aldehydes, for example, formaldehyde, are more valuable than the corresponding acids and hence it is generally desirable to increase the yield of the former at the expense of the latter.

It has now been found that such peroxides may be inactivated or destroyed by contacting the reaction mixture with a suitable substance which has an active surface due to its chemical character and/or to its degree of subdivision. Among such surface-active substances, mention may be made of silica gel, pumice, metallic gauze, Activated Alumina, fused alumina (aloxite), thorium oxide, zinc oxide, diatomaceous earths, fuller's earth, clay, pumice, charcoal, metal turnings, quartz chips, spun glass, steel wool, ceramic material, porous porcelain chips, common brick screenings, silicon carbide porous aggregates and the like. These substances may also be associated with or act as carriers for one or more easily oxidized metals which also promote the suppression of peroxide activity. Of such metals, a preferred group comprises copper, iron, cobalt, nickel, vanadium and silver.

In the oxidation of organic compounds such as propane, it has been found advantageous to use a catalyst bed of silicon carbide porous aggregates alone or silicon carbide porous aggregates covered or impregnated with silver or with another easily oxidizable metal such as those of the above named group. Or in the alternative, such a metal or metals may be deposited on one or more of the other above-listed surface-active agents. The particular metal which is deposited on the carrier may vary for different starting materials and for different end products desired. If, for example, silver is used, it may be deposited on the catalyst from a solution such as is commonly used for silvering mirrors. Instead of employing stationary catalyst beds the latter may also be ground up and their powder dispersed among the reaction products, as by a vapor current, mechanical agitation or the like.

It is not necessary that the catalyst be present in the oxidation zone, although this is permissible as well as often highly desirable. To obtain an improvement over the prior practice, however, it is essential only that the mixture of reacted gases be contacted with the peroxide-destroying catalyst before their separation, preferably without great delay. This minimizes or eliminates the danger from explosion in distilling the peroxide mixture after it has been condensed and it also nullifies the oxidation of carbonylic compounds, particularly to carboxylic acids and oxides of carbon.

However, other important advantages have been found in connection with the more immediate treatment of the reacted gases with the catalyst. The hot carbonyl-peroxide liquid condensate, for instance, is generally quite corrosive, it having been found, for instance, to attack even stainless steel very rapidly. On the other hand, the peroxide-free material is comparatively non-corrosive so that the saving in equipment from this aspect alone is not inconsiderable.

It has further been found, however, that in the controlled oxidation of organic compounds or hydrocarbons, such as propane for example, the output per unit time of valuable water-soluble reaction products is higher with a reactor fully packed for part of its length with the herein-described peroxide inactivating catalysts than with either an empty chamber or a tube thus packed for its entire length. That is, in comparison with the temperature and contact time necessary for an optimum yield with an unpacked reactor, a greater optimum yield may be obtained in a partially packed chamber at the same temperature with a shorter contact time or at a lower temperature.

Thus the reactor may contain alternate non-catalytic and packed catalyst sections having enough porosity to permit the passage and reaction of the gases at the desired speed. The non-catalytic section ahead of or between the catalyst sections permits the oxidation reaction to proceed until a substantial portion of the oxygen has been reacted, after which the gaseous mixture is led immediately into the catalyst packed section where the peroxides are inactivated or destroyed and further reaction ensues. More oxygen may then be introduced in a succeeding unpacked section and the reaction mixture then led into another catalytic section and so on. When operating on a small scale, it has been found convenient to place the catalyst in the bottom of a vertical reactor chamber, the gaseous mixture being introduced at the top. On a larger scale, however, it is more desirable to have a series of alternate non-catalytic and catalytically packed sections wherein the temperatures of the several chambers may be maintained at somewhat different levels.

The amount of packing or catalyst placed in the reactor is not critical within wide limits. Although optimum yields were obtained in the subsequent examples of the oxidation of propane with 25% packed reactors, comparably good results were obtained when from 6% to 50% of the free space in the reaction chamber was taken up by the catalyst. However, as noted, at least a part of the reactor preceding a catalyst section should preferably be free of the peroxide destroying material since the peroxides which are allowed to form in this first section exert a beneficial effect on the reaction upon their inactivation in the catalytic sector. Thus when the whole space is taken up by the catalytic packing, the yield of carbonylic compounds is greatly reduced, being even less than that obtained from an empty chamber. Without wishing to be committed to any theory of the reaction, the superior result with a partially packed reactor is probably associated with the presence of a hot spot or zone of excess temperature observed in the section of the packed zone immediately following the empty section. The reason the reactor packed throughout its entire length is ineffective for this reaction is probably that the gaseous reaction mixture or organic compound should have a certain minimum residence time at the reaction temperature before entering at least one catalytically packed section. That is, the vapor should be maintained at this temperature for the designated period before being exposed to further reaction conditions. This of course does not depend particularly on the empty reaction tube, but may be obtained by simply heating for the desired time. This period, however, is a reaction step and should be distinguished from an ordinary brief preheating procedure designed merely to raise the temperature of the feed material to a certain point and then immediately conduct it into the reaction zone.

In the vapor phase oxidation of organic compounds, in connection with which the use of the catalyst has been described, the starting material may be individual or mixed saturated and/or unsaturated hydrocarbons and/or their derivatives. However, the use of the peroxide-destroying catalyst is not limited to its application in any particular type of chemical reaction or to its association with any particular chemical compound (other than peroxides) employed or formed therein. Nor is it restricted to a continuous vapor phase process. The catalyst may be used to inactivate or destroy any organic or inorganic peroxide (in addition to hydrogen peroxide) in liquid or vapor phase, whether as a component of a reacting mixture, a component of a static system, or otherwise. Obviously the amount of catalyst may also be regulated, if desired, so that only a portion of the peroxides are destroyed, etc., and the rate of their inactivation regulated by the flow of the mixture and so on.

Although the invention is not limited to the use of the catalyst in connection with the oxidation of propane and/or homologous or analogous hydrocarbons, its effectiveness may be illustrated by further reference to its application in that process. The following examples were conducted under a pressure of 4.5 lbs./in.$^2$ which, however, is not critical. Increased pressure may tend to discourage peroxide formation, but the reaction may also be effected at atmospheric or reduced pressures.

*Example I*

A mixture of technical propane and oxygen at the ratio of 14 to 1 was preheated and passed into the top of a vertically mounted, 24 inch long 1280 cc. cylindrical Pyrex reactor at the rate of 35.5 mols per hour, while the pressure was maintained at 4.5 pounds gauge and the temperature at 410° to 415° C. Under these conditions, 81% of the oxygen was reacted to give a yield of 0.91 mol of carbonylic compounds, 0.31 gram atom active (peroxide) oxygen, and 0.04 mol organic acids per hour. The consumption of propane amounted to about 3% of that fed, and the rate of flow noted was that which gave an optimum yield in an unpacked reactor, under these conditions. The average contact time of the gaseous mixture in the reaction zone was about 3.0 seconds.

*Example II*

Silicon carbide porous aggregates were placed in the reaction tube until the bottom quarter of the vertical tube was filled, and the experiment was repeated. Eighty seven per cent of the oxygen was consumed to give a yield of 1.08 mols of carbonylic compound per hour; the product was free from peroxide and practically free from acids. Again about 3% of the propane was consumed and the amount of catalyst here used was found to give optimum yields of carbonylic compounds from propane oxidation under these conditions.

*Example III*

The previous experiment was repeated at a feed rate of 39.7 mols per hour of a similar gas mixture. The yields of aldehyde was 1.28 mols per hour; again the product was free from peroxide and practically free from acids. The faster flow rate here employed was that which produced optimum yield for a partially packed reactor under these conditions. The average contact time was about 2.7 seconds.

*Example IV*

The previous experiment was repeated after replacing the silicon carbide porous aggregates with a quantity of similar material which had been coated with silver. The yield of aldehyde was 1.36 mols per hour, again free from peroxide and practically free from acid. The ratio of mols of carbon as water-soluble products to mols of carbonylic product was considerably lower.

Example V

The experiment was repeated at the faster feed rate after the peroxide-destroying catalyst had been removed. The aldehyde yield was still only 0.91 mol per hour with a peroxide yield of 0.30 gram atom active oxygen and 0.04 mol of acid per hour.

The oxygen content of the feed may be increased to 10% or so, but above this concentration it presents serious difficulties in the way of temperature control. As more oxygen is employed, in this range, the reaction temperature may also be raised a little above that in the foregoing examples.

Although, for the sake of emphasis, the catalytically packed reaction section herein described has been contrasted with an empty, unpacked or non-catalytic section, it should be realized that this initial section by the present process need not be a vacant space but may be packed with any non-catalytic material in order to aid in the more uniform distribution of heat through the reaction space, assist in the more complete mixing of the reaction components and for other purposes.

The same procedure as illustrated in the above examples is applicable to the controlled oxidation of all hydrocarbons and suitable hydrocarbon derivatives such as halides (particularly vinyl type halides), hydroxy compounds, etc. Among the many applicable substances, particular mention may be made of methane, ethane, propane, butane, pentane, hexane, heptane, octane, nonane, decane, undecane, dodecane, their analogues, homologues and suitable substituted derivatives. For some of the higher molecular weight compounds, the oxidation conditions need not be as strenuous as for propane. In general, for substances comparable to propane, a residence time of from about half a second to about three seconds at a temperature in the range of about 350° C. to about 450° C. is indicated. Optimum conditions, of course, will vary from one substance to another. And, as indicated above, a series of residence periods in successive non-catalytic sections which alternate with catalytically packed sections is particularly recommended for a continuous operation, together with recycling of unreacted material for further conversion and the like.

The term "silicon carbide porous aggregates" as used in the appended claims is intended to comprise both the fixed bed and powder type catalysts as described in the foregoing specification. The silicon carbide porous aggregates used in the above examples was obtained from the Carborundum Company, Niagara Falls, New York. It is described as silicon carbide bound together with 5% to 25% of a material whose composition is:

| | Percent |
|---|---|
| Alkali ($K_2O + Na_2O$) | 8.5 |
| $Fe_2O_3$—$TiO_2$, MgO—CaO | 0.75 |
| $Al_2O_3$—$SiO_2$ | 90.75 |

The samples used were 8 to 10 mesh, although this is not considered critical. Additional advantages from the use of this catalyst are its ready reproducibility, due to its synthetic nature, and its high thermal conductivity which allows better temperature control.

In brief, the advantages which reside in the use of the process of the invention are, among others, the following:

1. The final product is relatively free from peroxide and organic acids and is therefore more easily purified and of greater commercial value.
2. Peroxides formed in the controlled oxidation of organic compounds are dangerous to handle and numerous references have been made to the explosive properties of the oxidation mixture. Destruction of the peroxide as herein described eliminates this danger.
3. The peroxide/aldehyde mixture ordinarily collected is corrosive. A condenser made from stainless steel was rapidly attached when the peroxides were not destroyed. The peroxide-free material is only slightly corrosive.
4. By the use of a partially packed reactor as herein described, the same optimum yield of aldehydes from organic compounds can be obtained at an increased rate of throughput.

We claim as our invention:

1. A process for the production of carbonylic compounds which comprises conveying a vaporous mixture of propane and oxygen, in which the oxygen content is less than about 10% by volume, through an unpacked oxidation reaction zone at a temperature of between about 350° C. and about 450° C. and at such a rate that the residence time in said zone is between about ½ second and about 3 seconds, withdrawing the reaction products from said zone, and contacting said products, immediately after withdrawal from the oxidation reaction zone, with a peroxide-inactivating catalyst comprising silicon carbide porous aggregates, thereby inhibiting side reactions and increasing the yield of carbonylic compounds.

2. A process for the production of carbonylic compounds which comprises conveying propane and oxygen, in the vapor state and at a temperature of between about 350° C. and about 450° C., through an oxidation reaction zone at such a rate that the residence time in said zone is between about ½ second and about 3 seconds, withdrawing the reaction products from said oxidation reaction zone and contacting said products, immediately after withdrawal from said reaction zone, with a peroxide-inactivating catalyst comprising silicon carbide porous aggregates, thereby inhibiting side reactions and increasing the yield of carbonylic compounds.

3. In a process for the production of carbonylic compounds wherein propane is subjected, in the vapor state and in an oxidation reaction zone, to the action of oxygen at a temperature of from about 350° C. to about 450° C., the improvement which comprises contacting the reaction mixture with a peroxide-inactivating catalyst comprising silicon carbide porous aggregates immediately after said mixture leaves the oxidation reaction zone.

4. In a process for the production of carbonylic compounds wherein a hydrocarbon is subjected, in the vapor state and in an oxidation reaction zone, to the action of oxygen at a temperature of from about 350° C. to about 450° C., the improvement which comprises contacting the reaction mixture thus formed with a peroxide-inactivating catalyst comprising silicon carbide porous aggregates immediately after said mixture leaves the oxidation reaction zone.

INGOLFUR BERGSTEINSSON.
JAMES R. SCHEIBLI.
FRANK H. DICKEY.